United States Patent

Drees et al.

Patent Number: 5,365,348
Date of Patent: Nov. 15, 1994

[54] PROCESS FOR PRINTING A HALFTONE IMAGE

[75] Inventors: Friedrich Drees; Raimund Nisius; Hartmut Grethen; Wolfgang Pekruhn, all of Berlin, Germany

[73] Assignee: Mannesmann Aktiengesellschaft, Dusseldorf, Germany

[21] Appl. No.: 969,200

[22] PCT Filed: Jul. 26, 1991

[86] PCT No.: PCT/DE91/00612

§ 371 Date: Apr. 8, 1993

§ 102(e) Date: Apr. 8, 1993

[87] PCT Pub. No.: WO92/03885

PCT Pub. Date: Mar. 5, 1992

[30] Foreign Application Priority Data

Aug. 13, 1990 [DE] Germany ............... 4025793

[51] Int. Cl.$^5$ ............... H04N 1/21
[52] U.S. Cl. ............... 358/298
[58] Field of Search ............... 358/298, 296, 300, 302; 355/200, 202; 346/108, 160

[56] References Cited

U.S. PATENT DOCUMENTS

| | | |
|---|---|---|
| 4,714,964 | 12/1987 | Sasaki . |
| 4,918,622 | 4/1990 | Granger et al. ............ 358/298 |
| 4,979,922 | 12/1990 | Manns et al. ............ 382/8 |

FOREIGN PATENT DOCUMENTS

| | | |
|---|---|---|
| 0027967A1 | 5/1981 | European Pat. Off. . |
| 2940402 | 10/1979 | Germany . |
| 2940402A1 | 4/1981 | Germany . |
| 3009333A1 | 9/1981 | Germany . |
| 3037774A1 | 4/1982 | Germany . |
| 3324215C2 | 1/1984 | Germany . |
| 3415776C2 | 10/1984 | Germany . |
| 3415778A1 | 10/1984 | Germany . |
| 3525011C2 | 1/1986 | Germany . |
| 3437063A1 | 4/1986 | Germany . |
| 3604577A1 | 10/1986 | Germany . |
| 3628198A1 | 2/1988 | Germany . |
| 3821616A1 | 2/1989 | Germany . |
| 3843645A1 | 7/1989 | Germany . |

*Primary Examiner*—Mark J. Reinhart
*Attorney, Agent, or Firm*—Cohen, Pontani, Lieberman, Pavane

[57] ABSTRACT

In a process for printing a halftone image a plurality of image data describing the halftone step of a halftone dot of a model image are taken over in processing frames. Color step values which determine color gradations of color dots and can be outputted optionally at print positions of a printing screen are obtained from the image data contained in the processing frames. To produce a reproduction image with a large number of halftone steps and, at the same time, a high local resolution in the region of contrast jumps of the model image, a color step value is obtained from each image datum by assigning a color step value existing in the reference pattern associated with the halftone step according to the halftone step described by the image datum and its position in the processing frame.

5 Claims, 6 Drawing Sheets

FIG 3

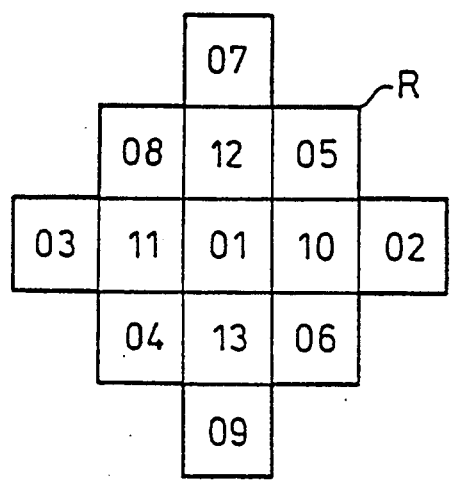
FIG 4
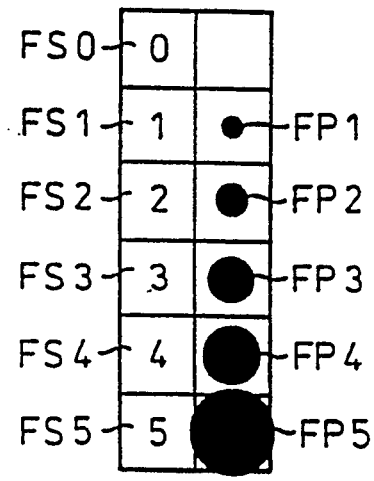
FIG 5
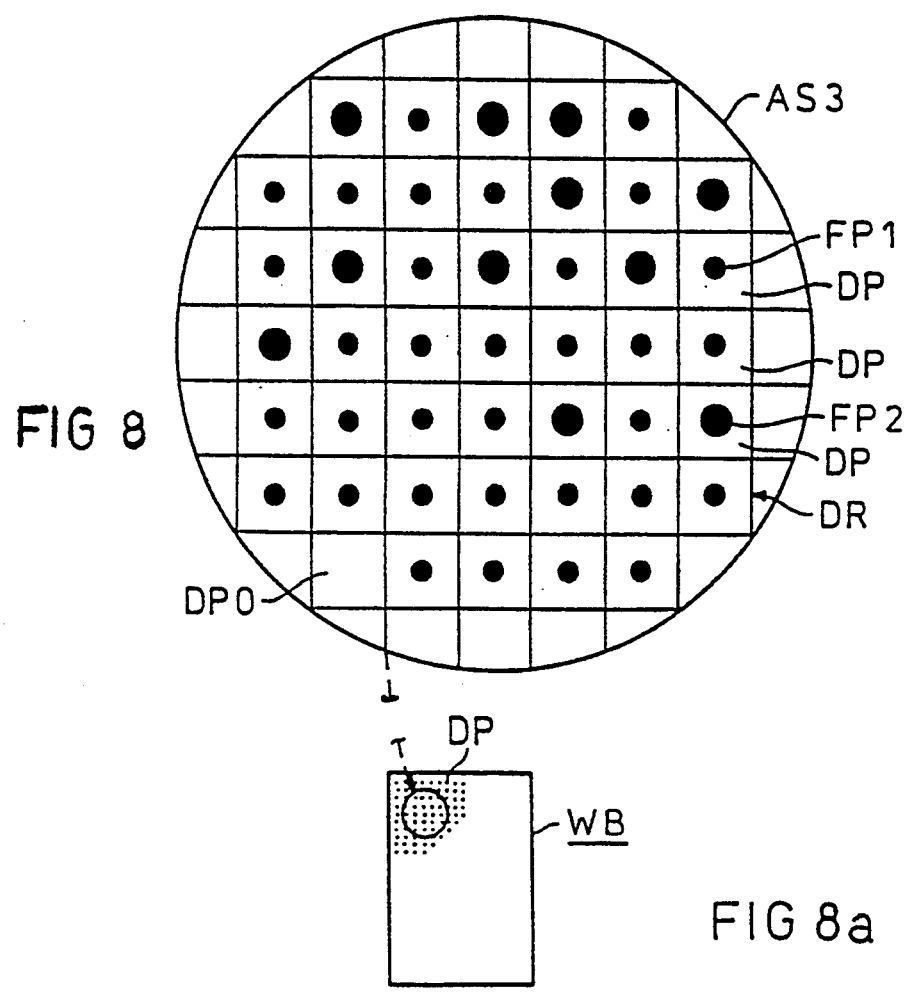
FIG 8
FIG 8a

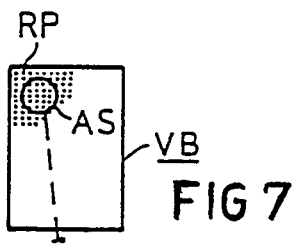
FIG 7
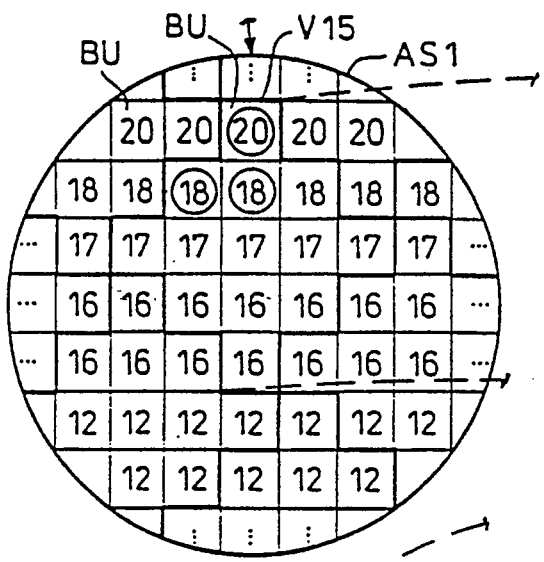
FIG 7a
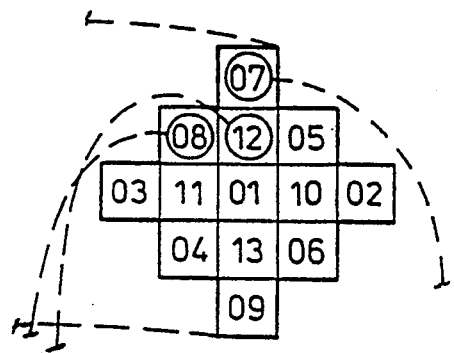
FIG 7b
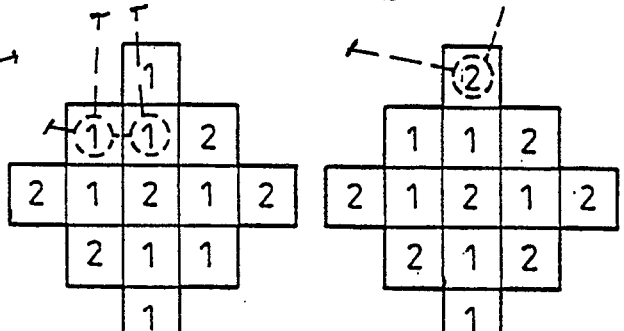
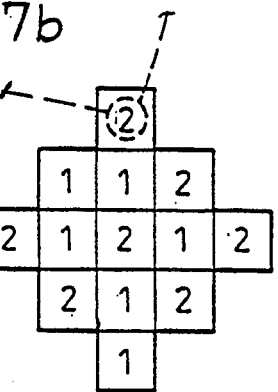
FIG 7c   FIG 7d
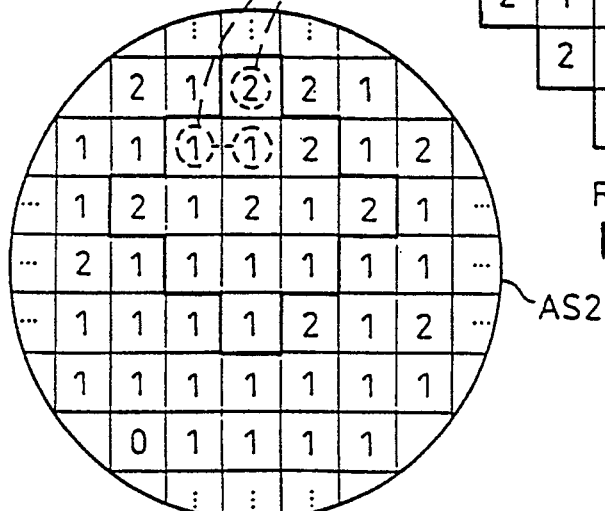
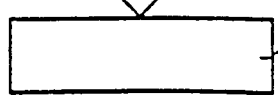
FIG 7e

PROCESS FOR PRINTING A HALFTONE IMAGE

BACKGROUND OF THE INVENTION

1. Field of the Invention

The invention is directed to a process for printing a halftone image according to image data, wherein every image datum describes the halftone step of a halftone dot of an artwork or model image. The process utilizes processing frames, having positions for the image data of a plurality of adjacent halftone dots. The image data are adopted in the processing frame in the arrangement of the halftone dots described therein. Color shade or step values are obtained from the image data contained in the processing frame and associated with print positions of a printing raster or screen, and color dots with graduated color gradations are optionally printed at the print positions produce the halftone steps. The color gradation of every color dot is adjusted according to the color step value associated with the respective print position.

Within the scope of the present invention, printing is fundamentally understood as the arrangement of color dots on a printed medium.

A process for printing a halftone image with a plurality of halftone steps is known from DE-PS 35 25 011, in which each image datum describes the halftone step of a halftone dot of a model image. A matrix including a number of print positions of a printing screen is associated with every image datum by observing threshold values. The print positions of every matrix can be covered by color dots of graduated color gradations (various sizes). In order to achieve a sufficient number of halftone steps in this known process, the matrix must include a corresponding number of print positions. However, the local resolution of the reproduced halftone image decreases considerably in comparison to the model image as the number of print positions per matrix increases. Therefore, in order to achieve a good image reproduction in spite of this, print heads with a very high resolution must be used in the known process. This technique raises the price of a corresponding printing device.

2. Description of the Related Art

The invention is based on a process for printing a halftone image known from EP 0 240 202 A1. In this process, also, there is a model image in the form of image data, wherein every image datum is associated with a halftone dot of the model image and describes its halftone step. Processing frames are used in this known process and every processing frame has positions for receiving a plurality of image data of adjacent halftone dots of the model image. The image data are adopted into the positions of the processing frames in the arrangement of halftone dots described by them. Color step values are obtained from the image data contained in the processing frames by averaging and these color step values are assigned to or associated with print positions of a printing screen. A color dot with graduated color gradations can be outputted optionally at each print position of the printing screen to produce the halftone steps. The color gradation of every color dot is determined by a color step value associated with one of the respective print positions. In the known process, the image data of a processing frame are evaluated jointly by averaging or interpolation and in this way a color step value is achieved which is associated with a number of print positions in the printing screen corresponding to the number of image data per processing frame. In this way, in contrast to the process known from DE-PS 35 25 011, a large number of halftone steps can be produced when using a print head whose resolution approximately corresponds to the resolution of the model image. This can be attributed to the number of print positions with which the obtained color step value is associated corresponds at least approximately to the number of image data contained in the processing frame. However, in the process known from EP 0 240 202 there is a considerably reduced local resolution in the region of sharp contrast jumps in the model image. That is, a contrast jump represented by image data within a processing frame cannot be shown in sharp definition due to the averaging. The human eye is extremely sensitive to such blurriness (mixing effects). This effect is aggravated as the number of image data or positions per processing frame increases.

SUMMARY OF THE INVENTION

The object of the present invention is to provide a process for printing a halftone image by which a large number of different halftone steps can be generated and a high local resolution is provided in every region.

This object is met in a process according to the invention of the type indicated in the beginning in that position numbers are assigned to the positions of the processing frames, a reference pattern with a predetermined arrangement of positions with predetermined color step values is associated with every halftone step, wherein the reference pattern corresponds to the processing frame with respect to structure and the position numbers of its positions, and a color step value for a print position is obtained from each image datum in that, according to the halftone step described by the image datum and the position number of its position in the processing frame, the color step value existing in the reference pattern associated with the halftone step at the position with the corresponding position number is associated with the corresponding print position.

The process according to the invention offers the advantage that reference patterns with a relatively large number of positions containing color step values can be used so that a large number of finely graduated halftone steps can be generated. At the same time, the process according to the invention advantageously enables a resolution in the region of contrast jumps of the model image, which resolution is determined only by the fineness of the printing screen and is dependent on the number of different color step values. Blurriness in the region of contrast jumps is accordingly prevented in an advantageous manner without the printing device requiring an increased resolution capacity in comparison to the screening of the model image.

According to an advantageous further development of the process according to the invention the visual impression of the halftone steps which can be produced is made uniform in that a maximum of two different color step values are contained in each reference pattern.

Another advantageous further development of the process according to the invention consists in that reference patterns are used which differ from one halftone step to the next in covering the positions in that a position is covered with a color step value which is increased by a step in comparison to the reference pattern of the next lowest halftone step, wherein the sequence of position numbers determines the sequence in which the positions are covered with a color step value which is increased by a step in each instance as the intensity of the halftone steps increases. Accordingly, a very uniform impression of color results in the regions of the reproduction image which correspond to the regions of the model image with approximately identical halftone steps. Contrast jumps and uniform impressions of color (textures) for the human eye are accordingly avoided in an advantageous manner.

The uniformity of a surface printed with identical or approximately identical halftone steps is further improved in another advantageous further development of the process according to the invention in that the position numbers in a processing frame are determined in such a way that the sum of the distances between positions with consecutive position numbers is a maximum, wherein the positions of immediately adjacent processing frames are also taken into account.

Since the human eye is particularly sensitive to textures or structures in the horizontal and/or vertical direction of the image, it is provided in an advantageous further development of the process according to the invention to use processing frames and reference patterns having a symmetrically lozenge-shaped structure.

In weighing the number of achievable halftone steps against the technical cost related to processing, processing frames and reference patterns with thirteen positions have proven particularly advantageous.

The invention is described in more detail in the following with reference to a drawing.

BRIEF DESCRIPTION OF THE DRAWINGS

FIG. 3 shows position numbers in processing frames and reference patterns;

FIG. 4 shows a preferred processing frame and a preferred reference pattern;

FIG. 5 shows color dots associated with color step values;

FIG. 7 and 8 shows details of FIG. 1; and

FIG. 8 shows the ratios in a contrast jump.

DESCRIPTION OF THE PREFERRED EMBODIMENTS

Figure 1:
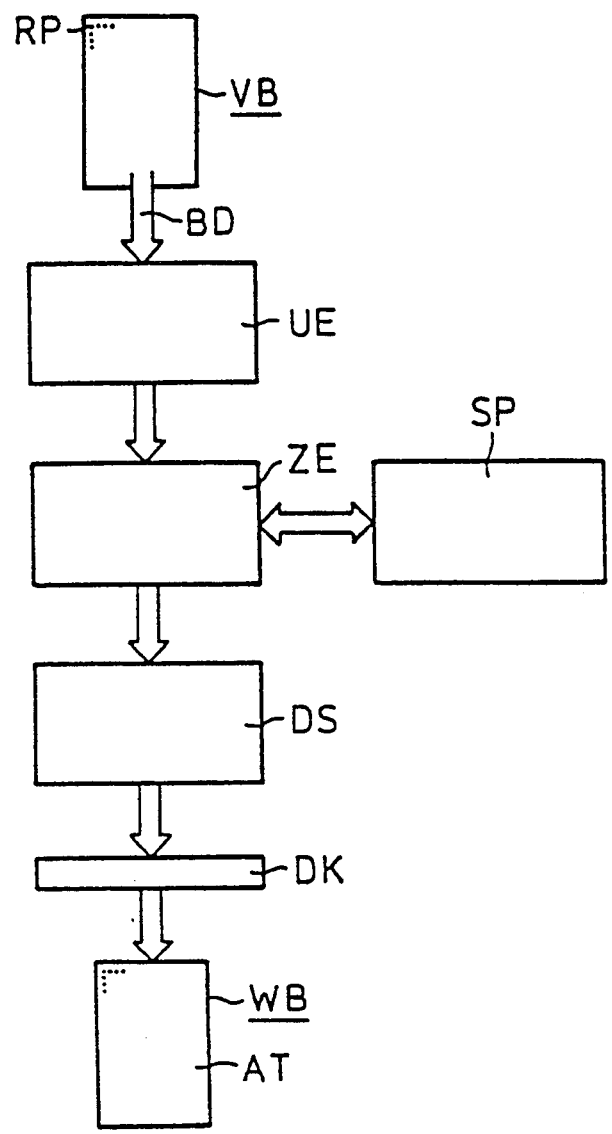
FIG. 1 is a schematic view of the process according to the invention.

FIG. 1 shows a model image VB in the form of digital image data BD. The image data BD can be generated e.g. by optical scanning of the model image VB. Each individual image datum of the image data BD represents a halftone dot RP with its halftone step at a determined location of the model image VB. Halftone step designates a gradation of the color of the model image (e.g. different gray shades in a black and white image) at this halftone dot. Image data BD of a plurality of adjacent halftone dots RP are associated with processing frames in a converting device UE in the arrangement in which the halftone dots RP represented by them are arranged on the model image VB. As is explained in more detail in the following with reference to FIGS. 7 and 8, a color step value is obtained from every image datum in an allocating device ZE by accessing reference patterns stored in a storage SP. The color step value determined in this way is written into a print data storage DS in a memory location which is associated with the halftone dot represented by the respective image datum. In order to print a reproduction image WB the data contained in the print data storage DS are fed to a print head DK containing a plurality of individually controllable print elements. For example, this can be a thermal print head in which the driving energy of the individual print elements brings about a color dot of varying magnitude, and accordingly varying color gradation, on a printed medium AT.

Figure 2:
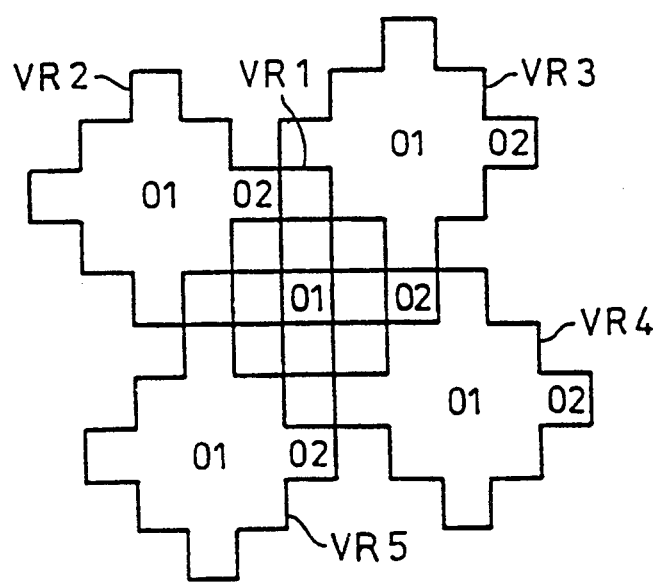
FIG. 2 is a schematic view of the determination of the position numbers.

FIG. 2 is a schematic view of the procedure for determining position numbers in a processing frame VR1, wherein additional processing frames VR2 to VR5 immediately adjacent to processing frame VR1 are also taken into account. To determine a particularly advantageous sequence of position numbers, the positions of the processing frames VR1 to VR5 are provided with position numbers in every conceivable combination of sequence. In FIG. 2, for example, position numbers 01 and 02 are already entered and the following position numbers 03 to 13 can be set in an optional manner until the processing frame is completely occupied by position numbers. The first position number 01 is set arbitrarily and the following position numbers are then set in a corresponding manner. In so doing, the distances to the position numbers which have already been set are determined and added. That sequence of position numbers, the sum of whose distances determined in this way are a maximum, is considered the most favorable.

Figure 3:
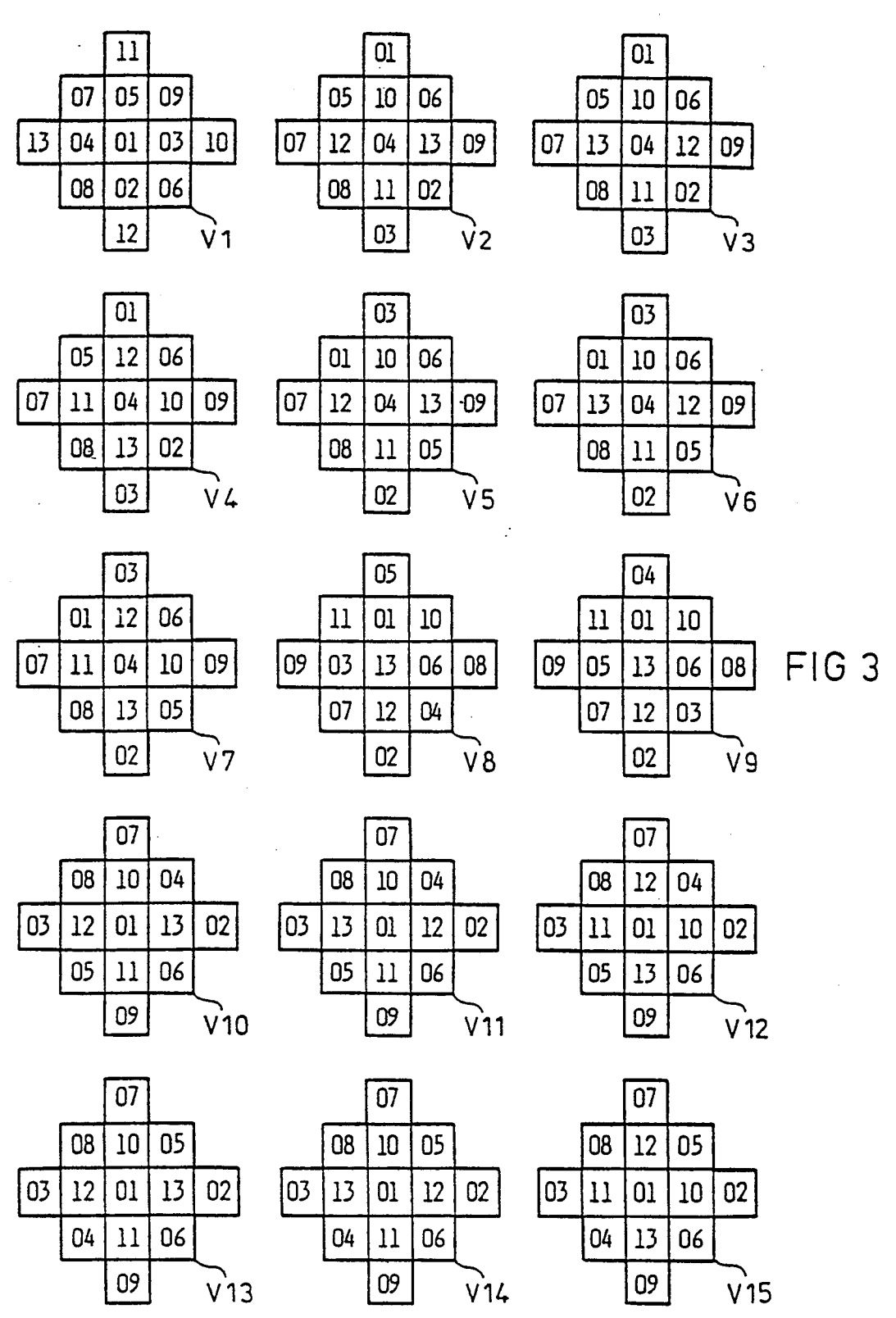

FIG. 3 shows fifteen position number sequences determined in the manner described above which are equivalent with respect to the aforementioned distances. Print tests have shown that processing frame V15, with its sequence of position numbers, is the most favorable for the process according to the invention because a particularly uniform impression results for the human eye in halftone surfaces with an increasing distribution of identical color dots according to the ascending position numbers.

FIG. 4 shows a reference pattern R which corresponds in its structure and arrangement of positions containing color step values (position numbers 01 to 13) to the processing frame V15 according to FIG. 3. The processing frame V15 as well as the reference pattern R have a lozenge-shaped, symmetrical structure and have a total of thirteen positions.

Figure 6:
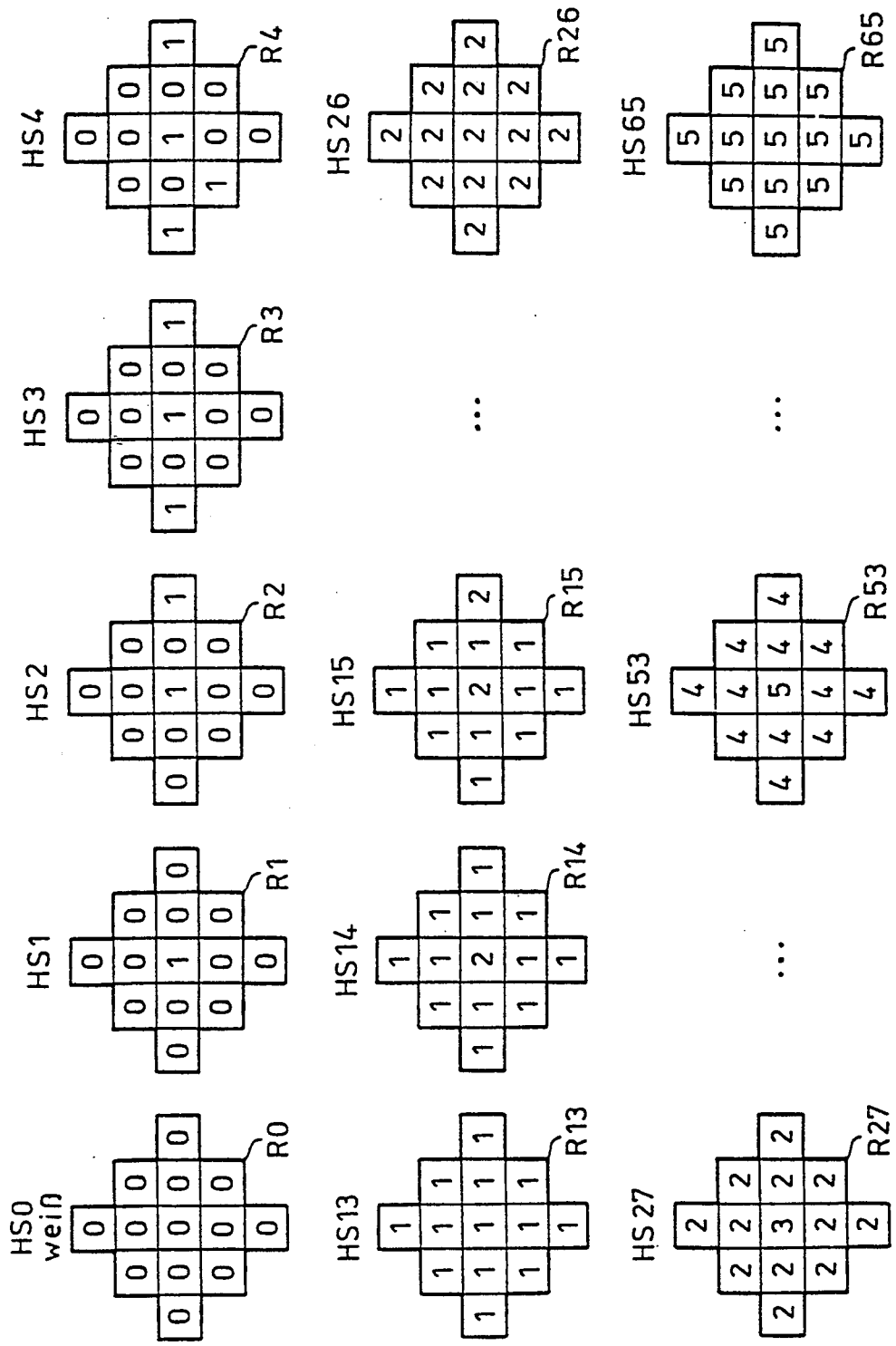
FIG. 6 shows reference patterns associated with different halftone steps.

The covering of reference patterns associated with different halftone steps with color step values FS0 to FS5 is described in the following with reference to FIGS. 5 and 6. According to FIG. 5, a color step value FS0 means that no color is applied to the respective print position (the printed medium is not imprinted in this location). Color dots FP1 to FP5 of increasing magnitude are generated as the color step values FS1 to FS5 increase. Only the arabic numeral of the color step value is entered in the reference patterns shown in FIG. 6 due to lack of space. For example, the numeral "5" symbolizes color step value FS5. Proceeding from reference pattern R in FIG. 4 with thirteen positions and given that a maximum of two different color step values are contained in each reference pattern, a total of 66 different reference patterns R0 to R65 result, each of which is assigned to a halftone step HS0 to HS65. The halftone step HS0 represents an unprinted region or a region with maximum brightness in the model image. Reference patterns R1 to R13 differ from one another in that an additional color dot FP1 is entered with each halftone step HS0 to HS65 increasing in intensity according to the ascending position numbers (FIG. 4) 01 to 13. In the halftone steps HS14 to HS26, a color step value is increased from FS1 to FS2 according to position numbers 01 to 13. The remaining halftone steps HS27 to HS65 are formed in an analogous manner.

In addition to the different magnitudes of the color dots FP1 to FP5, the different color step values FS1 to FS5 can also be converted by increasing optical densities of the color dots FP1 to FP5. When using a thermal print head (compare FIG. 1), the different magnitudes of the color dots FP1 to FP5 are realized by a correspondingly controlled supply of energy to the individual thermal elements of the thermal print head.

The process steps in the allocating device ZE (FIG. 1) are now described in FIG. 7 based on the processing frames and reference patterns with position numbers 1 to 13 described in the preceding. The symbolic model image VB includes a plurality of halftone dots RP, wherein a section AS of the model image VB is enlarged (AS1). The halftone step of each halftone dot RP is represented by an image datum BU. In the present case, again, only the arabic numeral of the respective halftone step is shown for lack of space. Thus, for example, "18" designates halftone step HS18. The compilation of thirteen image data in a processing frame V15 can be seen in section AS1 (compare FIG. 3). The processing frames adjoin one another without transition so that, to some extent, the entire model image surface is covered by processing frames and all image data are adopted in the processing frame, respectively. The organization or allocation carried out in the allocating device ZE (FIG. 1) is explained in the following with reference to three image data selected by way of example and identified by "0" in the processing frame V15. The uppermost image datum BU arranged at position number 07 of the processing frame V15 represents a halftone step HS20. In the reference pattern R20 associated with the halftone step HS20, the color step value 2 (FS2) is entered at position number 07. Therefore, the color step value FS2 is associated with this image datum and written into the print data storage DS in a corresponding position as shown in a suggestive manner in a print data storage section AS2. One image datum BU representing the halftone step HS18 is arranged in each instance in position numbers 08 and 12 of the processing frame V15. According to the reference pattern R18 associated with the halftone step HS18, these positions receive color step value 1 (FS1) in the print data storage DS. The same process is followed with all of the print data so that the print data storage section AS2 is finally covered with color step values as shown in FIG. 7. The print head DK is acted upon by the color step values obtained in this way.

FIG. 8 shows printing results achieved in this manner, wherein only one section AS3 of the reproduction image WB is shown. Substantially color dots FP1 and FP2 are shown, which are outputted at print positions DP. No color is applied to a print position DP0 since the corresponding memory location of the storage (AS2 in FIG. 7) contains the color step value FS0. The observer perceives a relatively uniform image from section AS3 without either horizontally or vertically extending patterns of color dot concentrations (textures) and with no substantial contrast jumps. This impression corresponds to the image data according to section AS1 (FIG. 7) which represent a relatively narrow range of halftone steps. By using reference patterns structured in a lozenge-shaped manner, an additional random distribution of the respective color dots FP1 and FP2 results in the reproduction image corresponding to the stepwise staggering of adjacent lozenges, which further increases the uniformity of a reproduction of a region provided with a uniform halftone step.

Figure 9:
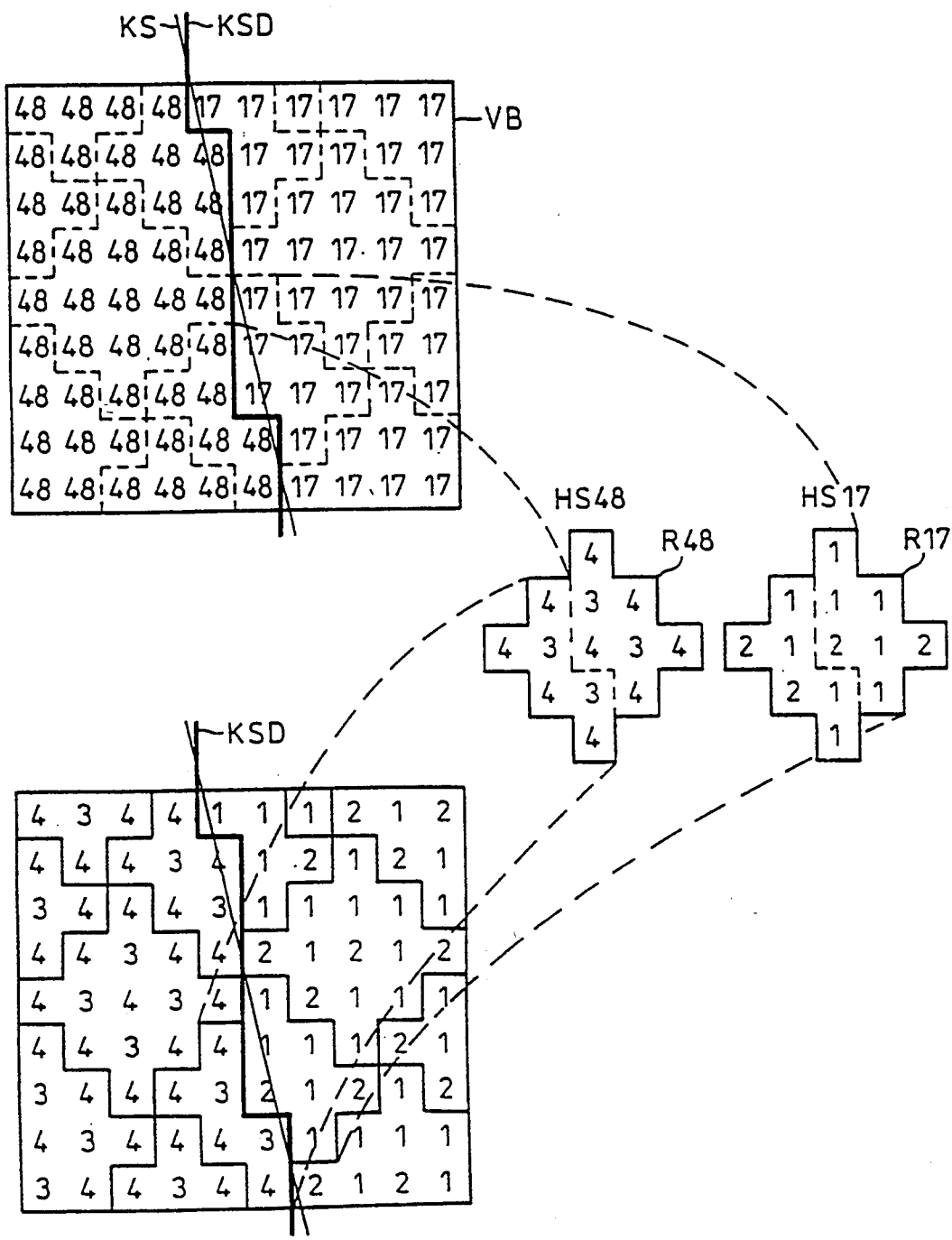

FIG. 9 shows the ratios in a contrast jump occurring within the model image VB. This contrast jump extends along a thin line KS in an analog model image. In a digitized model image VB in the present form, the contrast jump extends along line KSD. A region with a relatively intensive gray value (halftone step 48) is shown to the left of the line KSD and a region of relatively lower intensity (halftone step 17) is shown to the right of the line KSD. As is described with reference to FIG. 7, each individual image datum BU is evaluated and a color step value is associated with each image datum so that the contrast jump along line KDS leads to an arrangement of color step values according to reference pattern R17 for the halftone step HS17 to the right of line KSD and to an arrangement of color step values according to reference pattern R48 for the halftone step 48 to the left of line KSD. A fragmentary composition of image regions from reference pattern R17 and reference pattern R48 can be seen in the region of line KSD. Color step value jumps from 1 to 4 occur relatively frequently in this region so that a clear contrast line is visible to the human eye in the reproduction image WB. FIG. 9 simultaneously shows that in the region of homogeneous color gradations—e.g. to the left of the line KSD in halftone step 48—the arrangement of color step values is identical to the arrangement of the color step values in reference pattern R48 and a corresponding output of color dots FP3 and FP4 is effected. The same is true for the region to the right of line KSD.

The regions of homogeneous halftone steps are thus reproduced in a homogeneous arrangement of color dots which differ by a maximum of one color step value. Since the arrangement of the color step values in the reference patterns has no concentrations of color step values of a higher or lower value in the horizontal or vertical direction of the image, the observer perceives a uniform gray impression without disturbing textures in the reproduced image WB.

We claim:

1. A process for printing a half tone image from original image data represented as a plurality of respective halftone steps of a halftone dot of a model image, said process comprises the steps of:
    (a) defining a plurality of processing flames each having corresponding positions for image data represented by a plurality of adjacent halftone dots, wherein each of the positions are assigned a position number;
    (b) adopting the original image data in accordance with a selected one of the plurality of processing frames in correspondence to the positions of the plurality of adjacent halftone dots;
    (c) associating a corresponding reference pattern with each of the halftone steps, wherein the reference pattern has a plurality of predetermined color step values in correspondence to an arrangement and the position numbers of the positions of the selected one of the plurality of processing frame;
    (d) obtaining corresponding color step values from the image data adopted in step (b) in accordance with the corresponding reference pattern for each of the position numbers of the positions of the selected processing frame, the color step value contained in the corresponding reference pattern associated with the halftone step at a position with the corresponding position number is associated with a print position corresponding to each of the image data; and;

(e) printing color dots with graduated color gradations at the print positions to produce the halftone step, wherein the color gradation of each of the color dots is adjusted in accordance with the color step value corresponding to the print position.

2. A process according to claim 1, wherein at most two different color step values are contained in the corresponding reference pattern.

3. A process according to claim 1 wherein a first reference pattern corresponding to one halftone step is different than a second reference pattern corresponding to a next halftone step in covering the positions in that a position is covered with a color step value which is increased by a step in comparison to a reference pattern of the next lowest halftone step wherein a sequence of the position number determines a sequence in which the positions are covered with a color step value which is increased by a step in each instance as the intensity of the halftone steps increases.

4. A process according to claim 1, wherein the position numbers in a processing frame are determined in such a way that the sum of the distances between positions with consecutive position numbers is a maximum and in accordance with immediately adjacent processing frames.

5. A process according to claim 1, wherein the plurality of processing frames and each corresponding reference pattern have a symmetrically lozengeshaped structure.

* * * * *